United States Patent [19]

Kucera et al.

[11] Patent Number: 4,544,614
[45] Date of Patent: Oct. 1, 1985

[54] GLASS ELECTROLYTE COMPOSITION

[75] Inventors: Gene H. Kucera; Michael F. Roche, both of Downers Grove, Ill.

[73] Assignee: The United States of America as represented by the United States Department of Energy, Washington, D.C.

[21] Appl. No.: 689,735

[22] Filed: Jan. 8, 1985

[51] Int. Cl.$^4$ .............................................. H01M 6/18
[52] U.S. Cl. ....................................... 429/193; 501/55; 501/73; 501/103; 501/153; 501/154
[58] Field of Search ................ 429/193, 191; 501/103, 501/55, 105, 68, 153, 154, 73

[56] References Cited

U.S. PATENT DOCUMENTS

| | | | |
|---|---|---|---|
| 3,476,602 | 11/1969 | Brown et al. | 136/6 |
| 3,485,702 | 12/1969 | Mochel | 161/1 |
| 3,663,294 | 5/1972 | Levine | 136/6 |
| 3,829,331 | 8/1974 | Tsang | 136/146 |
| 4,223,077 | 9/1980 | Taylor | 429/191 |
| 4,237,196 | 12/1980 | Gütmann et al. | 429/50 |
| 4,432,891 | 2/1984 | Susman et al. | 252/518 |
| 4,465,744 | 8/1984 | Susman et al. | 429/191 |

OTHER PUBLICATIONS

Development of a Sodium-Sulfur Battery Suitable for Use by Elec. Utilities & for Vehicular Propulsion", U.S. DOE 1982, pp. 3-10, 32, 102-106.
Solid Electrolytes: Fundamentals & Applications Sym., 166 Meeting Elec. Soc., N.O. LA, Oct. 1984, "Invest. of Sod.-Ion Cond. Fluids in $Na_2O$-$ZrO_2$-$Al_2O_3$-$SiO_2$".
"Glass Electrolytes for Sodium/Sulfur Cells, 6th DOE Electrochem. Contractor's Review, Jun. 1984, pp. 26-28.

*Primary Examiner*—Charles F. Le Fevour
*Attorney, Agent, or Firm*—Hugh W. Glenn; Robert J. Fisher; Judson R. Hightower

[57] ABSTRACT

An ionically conductive glass is disclosed for use as electrolyte in a high temperature electrochemical cell, particularly a cell with sodium anode and sulfur cathode. The glass includes the constituents $Na_2O$, $ZrO_2$; $Al_2O_3$ and $SiO_2$ in selected proportions to be a single phase solid solution substantially free of crystalline regions and undissolved constituents. Other advantageous properties are an ionic conductivity in excess of $2 \times 10^{-3}$ (ohm-cm)$^{-1}$ at 300° C. and a glass transition temperature in excess of 500° C.

9 Claims, No Drawings

GLASS ELECTROLYTE COMPOSITION

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to a glass electrolyte composition for use in high-temperature electrochemical cells and batteries of such cells. It is contemplated that these batteries will have automotive and other vehicular use as well as use in the storage of electrical energy such as for off peak power load shifting.

Sodium-sulfur electrochemical cells are most often provided with an electrolyte of crystalline beta alumina which is characterized by very high ionic conductivity, for instance in the range of 0.1 to 1.0 $(\text{ohm-cm})^{-1}$. However this material like other crystalline compositions is frangible, brittle, and requires difficult and expensive fabrication techniques. Furthermore, it has not endured attack particularly at grain boundaries on long exposure to molten sodium, sulfur and polysulfides at cell conditions.

Amorphous glass electrolytes, although having greatly improved fabrication properties, have exhibited low ionic conductivities and often poor stability in the cell environment. Glass compositions predicted to have improved ionic conductivity may be difficult or impossible to prepare as a clear glass free of crystalline regions or of undissolved constituents, thus severely degrading the chemical stability and good fabrication properties of the pure material.

In one program, work done under U.S. DOE Contract No. DE-AC02-76ET25103, a hollow glass fiber of $Na_2O$, $B_2O_3$, $NaCl$ and $SiO_2$ was developed as electrolyte for a sodium-sulfur, secondary electrochemical cell. Very small diameter, elongated fibers provided a large electrolyte surface area and short ion migration path to at least partially offset the low ionic conductivity, e.g. at 300° C., $4-5\times10^{-5}$ $(\text{ohm-cm})^{-1}$ of the glass.

A substantial improvement in ion conductivity is exhibited by the glasses of Susman et al, U.S. Pat. No. 4,465,744. Ionic conductivities at 300° C. of up to $1.93\times10^{-3}$ $(\text{ohm-cm})^{-1}$ were found in glasses having compositions by mole percent of 29.6 to 33.3% $Na_2O$, 16.7 to 22.7% $ZrO_2$, 0 to 6.8% $P_2O_5$, and 40.9 to 50% $SiO_2$. Neither this patent nor applicants' subsequent research effort reveal glasses of single phase in this composition range with ionic conductivities in excess of $2\times10^{-3}$ $(\text{ohm-cm})^{-1}$.

Many of the prior compositions are difficult to prepare as a glass substantially free of crystalline regions or free phases of undissolved constituents. Special procedures and conditions, for instance as are described in U.S. Pat. Nos. 4,465,744 and 4,432,891, may be required. Where glass transition temperatures are low, the quenching must be conducted over a large temperature span from well above the melting point, rapidly through crystal nucleation temperatures to well below the glass transition temperature. Glasses with low transition temperatures may not remain stable at the high operating temperatures, of for instance a sodium-sulfur electrochemical cell. Also regions of undissolved constituents may be subject to chemical attack by the cell reactants. Consequently, it was unclear whether glass compositions outside the explored ranges could be prepared with substantially improved ionic conductivities. Also, it was unknown whether other compositions would be stable and chemically resistant at cell operating conditions.

Therefore in view of the foregoing it is an object of the present invention to provide an ionically conductive glass with improved ionic conductivity over those previously available for use in high-temperature, sodium-sulfur electrochemical cells.

It is a further object to provide such a glass substantially free of crystalline regions and undissolved constituent phases.

It is also an object to provide such a glass that is sufficiently stable and chemically resistant to high-temperature, sodium-sulfur environment such that the ionically conductive glass may be employed as a solid electrolyte.

SUMMARY OF THE INVENTION

In accordance with the present invention, an ionically conductive glass is provided that has an ionic conductivity in excess of $2\times10^{-3}$ $(\text{ohm-cm})^{-1}$ at 300° C. and includes by mole percent 40–48% $Na_2O$, 6–13% $ZrO_2$, 0.1–18% $Al_2O_3$ and 30–52% $SiO_2$, which glass is substantially resistent to chemical attack by molten sodium metal, molten sulfur including polysulfides and suitable for use in an electrochemical cell environment at 300°–400° C.

In a further aspect of the invention, the glass is of single phase, amorphous solid solution substantially free of undissolved constituents and crystalline regions.

In one other aspect, the glass exhibits a glass transition temperature in excess of 500° C.

In another aspect of the invention, an ionically conductive glass is provided for use as an electrolyte in a sodium-sulfur electrochemical cell, the glass having an ionic conductivity of at least $4\times10^{-3}$ $(\text{ohm-cm})^{-1}$ at 300° C., a glass transition temperature in excess of 500° C., and a crystalline nucleation temperature in excess of the glass transition temperature, the glass is a single phase of clear, amorphous solid solution substantially free of undissolved constituents and of crystalline regions, the glass consisting essentially of by mole percent 40–46% $Na_2O$, 6–12% $ZrO_2$, 6–18% $Al_2O_3$, and 30–42% $SiO_2$. In a preferred composition, the $Na_2O$ is in excess of 40%, the $SiO_2$ is not more than 40% and the combined $ZrO_2$ and $Al_2O_3$ concentrations are in excess of 23% with not more than 13% $ZrO_2$. In a more particularly preferred composition, the ionically conductive glass consists essentially of about 42% $Na_2O$, 10% $ZrO_2$, 16% $Al_2O_3$, and 32% $SiO_2$ with a glass transition temperature in excess of 600° C.

In other aspects, the glass composition is capable of preparation substantially without formation of crystalline regions or regions of undissolved constituents by the formation of a molten solution of at least 1700° C. followed by cooling at a moderate rate of 5°–10° C./sec to below the glass transition temperature.

DETAILED DESCRIPTION OF THE INVENTION

The glass composition of this invention includes 40–48% $Na_2O$, 6–13% $ZrO_2$, 0.1–18% $Al_2O_3$, and 30–52% $SiO_2$. Although trace or insignificant concentrations of other constituents may be present, such other constituents are unnecessary and possibly harmful in the formation of this single phase glass composition that does not include regions of crystal formation or of undissolved constituents. Previous workers have incorporated one or several of the above constituents in glasses but have not included or suggested all four of these constituents in the above compositional ranges to provide glasses with ionic conductivities of over $2\times10^{-3}$ $(ohm\text{-}cm)^{-1}$ at 300° C. that are suitable for use in the high temperature corrosive environment of a molten sodium-sulfur electrochemical cell.

The inventors expect a glass of the foregoing composition to be especially well suited for use as electrolyte in sodium-sulfur high temperature cells and batteries of such cells. Not only are ionic conductivities in excess of $2\times10^{-3}$ consistently obtained but conductivities of over $7\times10^{-3}$ have been observed with potential for conductivities of more than $10^{-2}$ $(ohm\text{-}cm)^{-1}$ indicated. Furthermore, the ionically conductive glass has sufficient characteristics such as structural integrity, high glass transition temperatures and chemical resistance to be fabricated into appropriate shapes and used as a stable electrolyte in a high temperature sodium-sulfur environment. The glass can be pulled or extruded by known methods to form thin, elongated hollow fibers. Also, it can be rolled or cast into thin, flat sheets or disks to be used as electrolytes in known electrochemical cell designs. In addition to cell designs studied under the U.S. DOE Contract No. DE-AC02-76ET25103, others as described or referenced in U.S. Pat. No. 4,465,744 may advantageously incorporate the present glass electrolyte.

Electrolyte glasses within the inventive range can be prepared without the formation of crystalline regions within the glass. Crystalline regions or nuclei can impart the disadvantageous properties of brittleness, fragility, and difficulty in fabrication. The inventive glass composition permits preparation at moderate quenching rates of 5°–10° C./sec without crystalline formation. In addition, it must be remembered that sufficiently high glass transition and crystal nucleation temperatures are required to ensure stability of the glass at the cell operating temperature, typically 300°–400° C. for sodium-sulfur cells.

In one manner of preparing the novel glass electrolyte composition, stoichiometric quantities of $Na_2CO_3$, $Al_2O_3$, $ZrO_2$ and $SiO_2$ are heated to about 800°–1000° C. until all $CO_2$ gas is evolved. The temperature is then raised to about 1700° C. with intermittent stirring to produce a single-phase melt of the constituents. The melt is poured into a heated mold and cooled at rates estimated at about 5°–10° C. per second to form a glass that is substantially free of undissolved constituents and of crystalline regions. Where electrical measurement are to be made, electrical leads can be potted into the glass. The glass may be annealed at a temperature below the glass transition temperature to enhance strength and physical properties.

The following Example further illustrates the present invention.

EXAMPLE

A glass composition including by mole percent, about 42% $Na_2O$, 10% $ZrO_2$, 16% $Al_2O_3$ and 32% $SiO_2$ is prepared substantially as described by heating measured stoichiometric amounts in a platinum crucible to about 900° C. for about four hours or until all of the $CO_2$ gas is evolved. A melt at about 1700° C. is formed and cast into a preheated boron nitride mold of disk-shape with potted nickel leads. The melt is cooled to below the glass transition temperature (about 630° C.) in about 2–3 minutes to form a clear glass substantially free of undissolved constituents or crystalline regions.

In Table I, examples of various other glass compositions are illustrated.

TABLE I

| Composition, mol % | | | | Transition Temperature, Tg, °C., 20° C./min | Ionic Conductivity $(ohm\text{-}cm)^{-1} \times 10^3$ |
|---|---|---|---|---|---|
| $Na_2O$ | $Al_2O_3$ | $ZrO_2$ | $SiO_2$ | | |
| 36.32 | 0.13 | 12.51 | 51.04 | 616 | 3.1 |
| 40.95 | 0.04 | 7.87 | 51.14 | 517 | 5.1 |
| 42.06 | 0.05 | 10.27 | 47.62 | 564 | 5.5 |
| 45.49 | 0.05 | 11.36 | 43.10 | 548 | 6.9 |
| 41.39 | 8.21 | 5.80 | 44.60 | 538 | 5.2 |
| 41.09 | 6.39 | 3.99 | 48.53 | 516 | 7.7 |
| 39.10 | 14.73 | 11.57 | 34.60 | 668 | 3.6 |
| 37.95 | 13.48 | 11.38 | 37.19 | 708 | 2.6 |
| 41.93 | 16.02 | 9.96 | 32.09 | 633 | 4.0 |
| 41.76 | 15.91 | 12.30 | 30.03 | 644 | 2.9 |
| 38.51 | 13.33 | 12.18 | 35.98 | 657 | 2.2 |
| 40.71 | 10.85 | 8.28 | 40.16 | 598 | 4.7 |
| 39.69 | 11.89 | 0.11 | 48.31 | 479 | 3.2 |

Referring to Table II, the chemical resistance and stability of several glass electrolytes of the inventive and of neighboring compositions are given. The tests were conducted at 400° C. for 1000 hours on glass bars of 2 cm length and 6 mm × 6 mm cross-section. Separate samples were tested with molten sodium, molten sodium polysulfide and with molten sulfur.

TABLE II

| Composition, mol % | | | | Change in weight, mg/cm², After Exposure to: | | |
|---|---|---|---|---|---|---|
| $Na_2O$ | $Al_2O_3$ | $ZrO_2$ | $SiO_2$ | S | $Na_2S_4$ | Na |
| 22.6 | 0.03 | — | 77.3 | −0.20 | −0.17 | 5.70 |
| 25.0 | 12.4 | — | 62.5 | −0.15 | −0.79 | 10.96 |
| 37.2 | 11.4 | — | 51.4 | −0.23 | −0.36 | 0.70 |
| 40.2 | 17.0 | — | 42.8 | −0.16 | −1.53 | −0.07 |
| 41.0 | 0.04 | 7.87 | 51.1 | −0.38 | −0.98 | −0.67 |
| 41.4 | 8.21 | 5.8 | 44.6 | −0.37 | −0.42 | 0.53 |
| 46.0 | — | 4.3 | 49.7 | −0.77 | −7.83 | −2.46 |

It is seen from Table II that good chemical resistance was exhibited by the inventive composition and by certain close neighboring compositions on exposure to the reactants of a molten sodium-sulfur electrochemical cell. Samples with high silica concentrations and low alumina-zirconia combined levels were severely attacked by the molten sodium or sodium polysulfide.

From the above and other observations made by the inventors, the corrosion resistance and ionic conductivity of the preferred glass composition is unexpectedly enhanced by including not more than 40 mole % $SiO_2$, more than 40 mole % $Na_2O$, not more than 13 mole % $ZrO_2$ but more than 23 mole % combined zirconia-alumina concentration. The high level of combined zirconia-alumina is expected to enhance stability but high zirconia levels have been found to leave regions of free zirconia that may be detrimental to the chemical resistance of the glass.

It therefore is seen that the present invention provides a novel ionically conductive glass for use as electrolyte in a high temperature electrochemical cell environment. The glass exhibits ionic conductivity substantially greater than previous sodium ion conductive glasses. The glass can be made without elaborate or extreme procedures to provide an electrolyte substantially free of undissolved constituents or crystalline regions but with good physical properties and chemical stability. Furthermore, sufficiently high glass transition temperatures are achieved to enhance stability under the high temperature environment of a molten reactant electrochemical cell.

Although the present invention is described in terms of specific materials and procedures, it will be clear to the skilled artisan that various modifications may be made within the scope of the claims to this invention.

The embodiments of this invention in which an exclusive property or privilege is claimed are defined as follows:

1. An ionically conductive glass having an ionic conductivity in excess of $2 \times 10^{-3}$ (ohm-cm)$^{-1}$ at 300° C. comprising by mole %:
40–48% $Na_2O$
6–14% $ZrO_2$
0.1–18% $Al_2O_3$
30–52% $SiO_2$
said glass being substantially resistant to chemical attack by molten sodium metal, molten sulfur including polysulfides at electrochemical cell operating conditions of 300°–400° C.

2. The ionically conductive glass of claim 1 wherein said glass is substantially clear of crystalline nuclei regions.

3. The ionically conductive glass of claim 1 wherein said glass has a transition temperature of more than 500° C. and a crystalline nucleation temperature in excess of the glass transition temperature.

4. The ionically conductive glass of claim 1 wherein said glass is substantially a single phase of clear amorphous solid solution substantially free of undissolved constituents.

5. The ionically conductive glass of claim 1 for use as electrolyte in a sodium-sulfur electrochemical cell having an ionic conductivity of at least $4 \times 10^{31\ 3}$ (ohm-cm)$^{-1}$ at 300° C., a glass transition temperature in excess of 500° C., and being a single phase of clear amorphous solid solution substantially free of undissolved constituents and of crystalline regions, said glass consisting essentially of, by mole percent:
40–46% $Na_2O$
6–12% $ZrO_2$
6–18% $Al_2O_3$
30–42% $SiO_2$.

6. The ionically conductive glass of claim 5 wherein said $Na_2O$ is in excess of 40%, said $SiO_2$ is not more than 40% and the combined $ZrO_2$ and $Al_2O_3$ concentrations are more than 23%.

7. The ionically conductive glass of claim 5 wherein said glass consists essentially of by mole percent about 42% $Na_2O$, 10% $ZrO_2$, 16% $Al_2O_3$, and 32% $SiO_2$, said glass has a glass transition temperature in excess of 600° C. and an ionic conductivity of about $4.0 \times 10^{-3}$ (ohm-cm)$^{-1}$ at 300° C.

8. The ionically conductive glass of claim 5 prepared by forming a molten solution of said glass constituents in a single liquid phase at a temperature of 1700° C. and cooling said molten solution at a rate of 5°–10° C./sec to below its glass transition temperature to form a solid, single-phase glass substantially without undissolved constituents or crystalline regions.

9. The ionically conductive glass of claim 8 wherein said solid glass phase is annealed at a temperature below the glass transition temperature.

* * * * *